United States Patent
Guan

(10) Patent No.: US 6,995,526 B1
(45) Date of Patent: Feb. 7, 2006

(54) DIGITALLY CONTROLLED VERTICAL C LINEARITY CORRECTION WITH CONSTANT START AND END POINTS WITHOUT USING AN AGC

(75) Inventor: Charles Guan, San Francisco, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 10/914,561

(22) Filed: Aug. 9, 2004

(51) Int. Cl.
*G09G 1/04* (2006.01)
*H01J 29/70* (2006.01)

(52) U.S. Cl. .................. 315/370; 315/399; 315/411
(58) Field of Classification Search ........... 315/399, 315/393, 380, 383, 368.23, 368.16, 411, 370, 315/371
See application file for complete search history.

(56) References Cited

U.S. PATENT DOCUMENTS

| | | | | |
|---|---|---|---|---|
| 4,305,022 A | * | 12/1981 | Mitamura et al. | 315/370 |
| 5,414,330 A | * | 5/1995 | Tsujihara et al. | 315/371 |
| 5,986,635 A | * | 11/1999 | Naka et al. | 715/716 |
| 6,243,224 B1 | * | 6/2001 | Sacks et al. | 360/77.08 |
| 6,577,083 B1 | * | 6/2003 | Guan | 315/370 |
| 6,937,617 B2 | * | 8/2005 | Rakib et al. | 370/485 |
| 2002/0001040 A1 | * | 1/2002 | Hibi | 348/380 |
| 2003/0156603 A1 | * | 8/2003 | Rakib et al. | 370/485 |
| 2005/0018916 A1 | * | 1/2005 | Kondo | 382/238 |

OTHER PUBLICATIONS

STMicroelectronics. TDAS9112 Low-Cost I²C Controlled Deflection Processor for Multisync Monitor. Aug. 2003. 26pp.

* cited by examiner

*Primary Examiner*—Tuyet Vo
*Assistant Examiner*—Hung Tran Vy
(74) *Attorney, Agent, or Firm*—Darby & Darby PC; John W. Branch

(57) ABSTRACT

A method and circuit for digitally controlled vertical C linearity correction with constant start and end points without using an AGC. A squared voltage and a negative squared voltage are added as a correction voltage to a sawtooth-shaped ramping voltage that is employed to sweep an electron beam across a display. Line spacing toward the edges of a screen are maintained equal as a result enabling a uniform presentation of a picture on a non-spherical display. A digitally controlled attenuator determines a correction coefficient for correction voltages. The correction voltage is also processed by a sample-and-hold circuit to obtain a peak squared voltage. The peak squared voltage is then compared to a DC reference voltage and an offset adjustment current determined, based on a result of the comparison. The correction voltage is then added to the ramping voltage, which is also shifted by the offset amount.

16 Claims, 5 Drawing Sheets

DIGITALLY CONTROLLED VERTICAL C LINEARITY CORRECTION WITH CONSTANT START AND END POINTS WITHOUT USING AN AGC

FIELD OF THE INVENTION

The present invention relates to cathode ray tube (CRT) controls, and in particular, to a method and circuit for performing a digitally controlled vertical C linearity correction with constant start and end points without using automatic gain control (AGC).

BACKGROUND

Cathode Ray Tube's (CRT's) are commonly used in many industrial and consumer electronic devices such as EKG-monitors, oscilloscopes, computer monitors, TV's, and the like. CRT based monitors typically include a CRT and control circuitry. The CRT generally comprises a glass tube with a "bottle neck" portion and a screen, an electron beam gun, and filter devices that are arranged to mask and guide the electron beam.

The screen is internally coated with a photo-emitting material (commonly, a phosphor-based chemical), which is activated by the electron beam. When electrons impinge on the inside of the screen, the energetic electrons collide with photo-emitting material that generate pixels on the display. Because the screen is not shaped as a perfect sphere and the displayed information is generally rectangularly shaped, an intensity of the electron beam is controlled by various circuits for different regions of the display.

Control circuitry includes horizontal and vertical control circuits among other sub-circuits. While the horizontal control circuit manages an adjustment and a correction of horizontal deflection frequency, the vertical control circuit's main goal is to drive vertical deflection output stage. The vertical control circuit generally provides a sawtooth waveform for geometric linearity corrections of the electron beam.

Thus, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein.

DETAILED DESCRIPTION

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment or an embodiment combining software and hardware aspects. The following detailed description is, therefore, not to be taken in a limiting sense.

Briefly stated, the present invention is related to providing digitally controlled vertical C linearity correction with constant start and end points without using an AGC. In a typical CRT-based monitor, an electron beam is swept by a horizontal and a vertical sweep voltage. The sweep voltage commonly has a substantially sawtooth shape. Because a screen of a CRT tube is not substantially spherical and an angle of deflection is different at a top and bottom of a screen versus a middle of the screen, line spacing toward the edges of the screen may need to be modified to preserve uniformity of the displayed picture.

To preserve the uniformity of the picture, a C correction may be applied to the sweep voltage, also termed ramping voltage $V_{ramp}$. The C correction is essentially a squared voltage (the term C is derived from the C-like shape of a second order parabolic shape of the squared voltage), which is added onto the sawtooth-like ramping voltage. To provide the linear correction at the top of the screen, the squared voltage $V_{sqr}$ may be added. To provide the linear correction at the bottom of the screen, a negative squared voltage $V_{sqr}'$ may be added to $V_{ramp}$.

According to one aspect of the present invention, a digitally controlled resistor attenuator determines a correction coefficient for $V_{sqr}$ and $V_{sqr}'$. Because the addition of $V_{sqr}$ and $V_{sqr}'$ may shift a start point and an end point of the sawtooth-shaped ramping voltage, an offset factor may also be applied for constant start and end points of $V_{ramp}$. An output voltage, which is based on an addition of $V_{sqr}$ or $V_{sqr}'$ to $V_{ramp}$ with the offset factor applied, may be employed to control a vertical sweep of the electron beam in the CRT.

Figure 1:
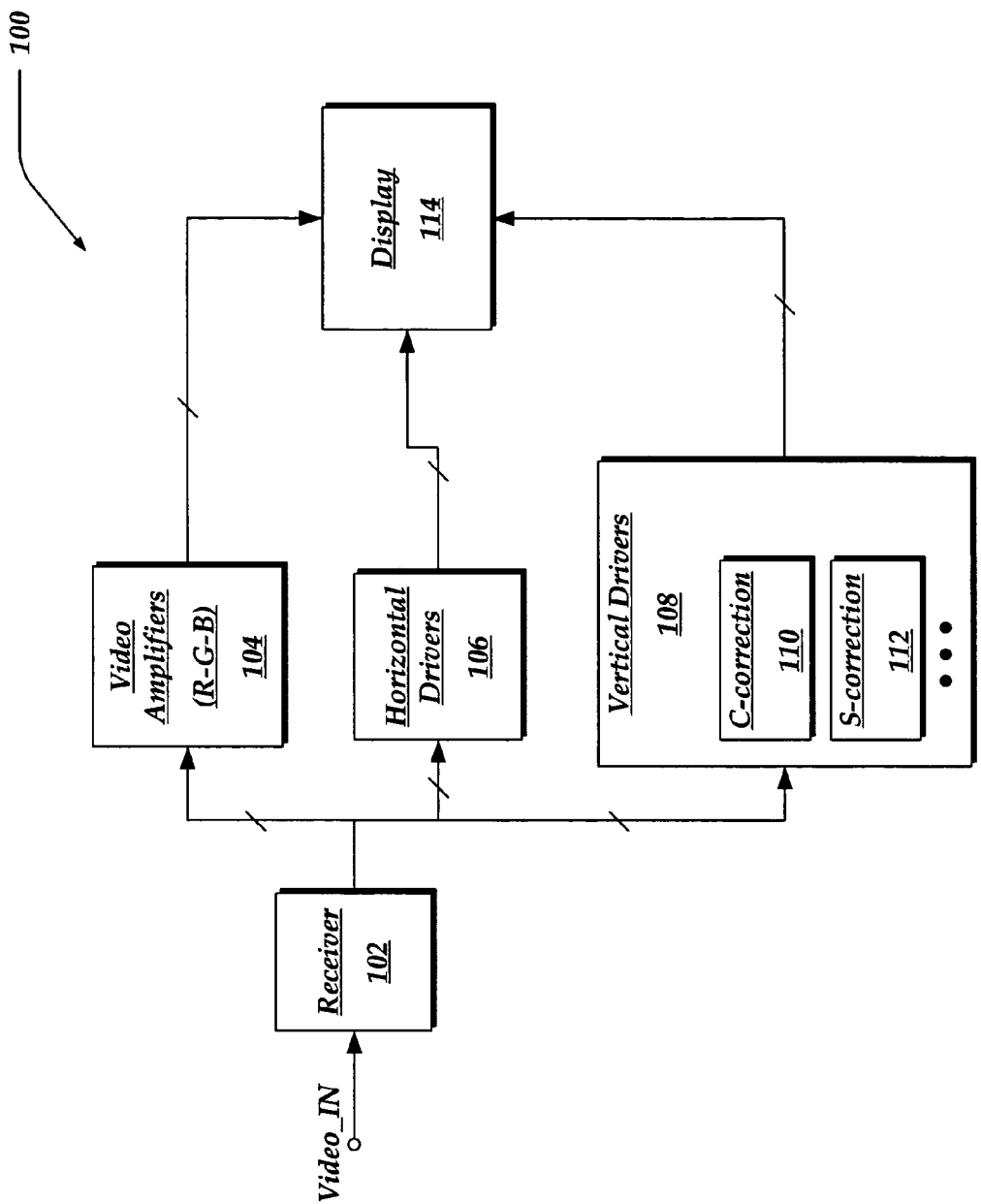
FIG. 1 is a block diagram illustrating a CRT-based monitor and its control circuitry.

FIG. 1 is a block diagram illustrating CRT-based monitor 100 and its control circuitry. CRT-based monitor 100 includes receiver 102, video amplifiers 104, horizontal drivers 106, vertical drivers 108, and display 114. Vertical drivers 108 may include among other circuits, C linearity correction circuit 110, and S linearity correction circuit 112. CRT-based monitor 100 may include additional components known to those skilled in the art.

CRT-based monitor 100 is arranged to receive an external signal Video_IN at receiver 102 and display a picture on display 114 based on Video_IN. Receiver 102 is arranged to process Video_IN and provide control circuitry, such as video amplifiers 104, horizontal drivers 106, vertical drivers 108, and the like, with an input signal. Typically, display 114 includes an electron beam generator, a screen, and filtering and control devices that may be driven by outputs of video amplifiers 104, horizontal drivers 106, vertical drivers 108, and the like. An internal surface of the screen may be coated with photo-emitting material that is activated by an electron beam from the electron beam generator.

In a color CRT-based monitor, the electron beam or multiple electron beams may be directed to different color emitting pixels on the screen such as red-green-blue. Such a monitor may include multiple video amplifiers 104 for each basic color (red, green, and blue).

The electron beam is commonly swept across the screen horizontally and vertically to form the desired picture on the screen. Horizontal drivers 106 and vertical drivers 108 are arranged to provide voltages for sweeping the electron beam across the screen. Because a shape of the screen is typically not an ideal sphere and a desired picture is typically substantially rectangular, non-linearities may occur in form of non-linear vertical line spacing, and the like.

To compensate for those non-linearities, correction factors may be applied to horizontal and vertical sweep voltages provided by horizontal drivers 106 and vertical drivers 108. In one embodiment, vertical drivers 108 may include a C linearity correction circuit 110 and a S linearity correction circuit 112. These circuits may correct the sweep voltages such that line spacing toward a top and bottom edge of the screen is maintained the same as in a center of the screen. C linearity correction circuit 110 is discussed in more detail below in conjunction with FIGS. 2 and 3.

FIG. 1 shows a particular arrangement of inputs and outputs of the various components. Other arrangements of the components may be implemented without departing from the scope and spirit of the present invention.

Figure 2:
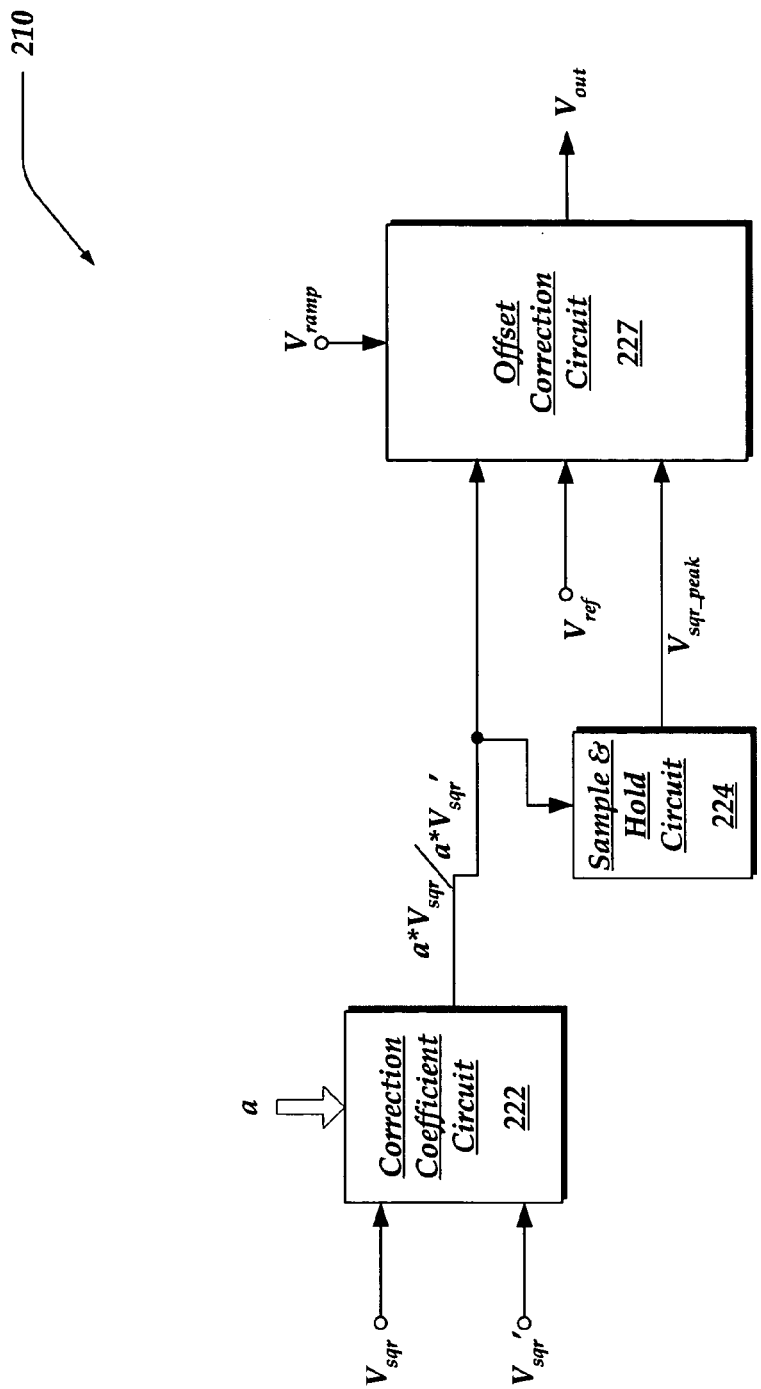
FIG. 2 is a block diagram illustrating one embodiment of a vertical C linearity correction circuit.

FIG. 2 is a block diagram illustrating vertical C linearity correction circuit 210. Vertical C linearity correction circuit 210 may be implemented in a vertical control section of a CRT control circuitry such as vertical drivers 108 of FIG. 1. Vertical C linearity correction circuit 210 includes correction coefficient circuit 222, sample-and-hold circuit 224, and offset correction circuit 227.

Vertical C linearity correction circuit 210 is arranged to provide a corrected output voltage $V_{out}$ such that horizontal lines on a screen are equally spaced toward a top and bottom edge of the screen. Typically, a positive C correction is applied for equally spaced horizontal lines at the top of the screen, and a negative C correction is applied for equally spaced horizontal lines at the bottom of the screen. As described above, the term C correction is derived from a parabolic shape of a squared voltage $V_{sqr}$ that is added to a sawtooth-shaped ramping voltage $V_{ramp}$ for correction. Because an amount of C correction that is desired may vary from one CRT to another, digital control of the C correction may provide for ease and lower cost of manufacturing.

The squared voltage for C correction may be derived from the ramping voltage itself such that a corrected output voltage may be expressed as:

$$V_{out}=V_{ramp}+a*V_{ramp}^2,\qquad(1)$$

where "a" is a correction coefficient. Accordingly, $V_{sqr}=V_{ramp}^2$. The correction coefficient "a" may be negative or positive for correction at the top and at the bottom of the screen. In one embodiment, a value of $V_{ramp}$ at the center of a sawtooth-shaped waveform may be employed to derive the squared voltage.

The addition of $a*V_{sqr}$ to $V_{ramp}$ may shift output voltage $V_{out}$ up or down depending on a positive or negative value of "a", respectively. Accordingly, a start and an end point of the output voltage may shift up or down resulting in a shift of the picture vertically on the screen. Previously, an automatic gain control (AGC) circuit has been employed to compensate for this undesired shifting effect of C linearity correction.

According to one embodiment of the invention, the shifting effect of C linearity correction is compensated without employing an AGC. Vertical C linearity correction circuit 210 provides a solution to the shifting problem by introducing an offset correction factor based on a peak of the squared voltage $V_{sqr\_peak}$. Thus the output voltage as generated by vertical C linearity correction circuit 210 may be expressed as:

$$V_{out}=V_{ramp}+a*V_{sqr}-a*V_{sqr\_peak}.\qquad(2)$$

As shown in the figure, both positive and negative squared voltages $V_{sqr}$ and $V_{sqr}'$ are provided to correction coefficient circuit 222. Correction coefficient circuit 222 is arranged to provide correction coefficient "a". In one embodiment, correction coefficient circuit 222 may include a digitally controlled attenuator to multiply $V_{sqr}$ with "a". An output voltage $a*V_{sqr}$ of the correction coefficient circuit 222 may be provided to sample-and-hold circuit 224 and to combination circuit 228.

Sample-and-hold circuit 224 is arranged to determine $V_{sqr\_peak}$ and provide it to offset generation circuit 226 for compensation of the shifting effect that results from the addition of $V_{sqr}$ to ramping voltage $V_{ramp}$.

Offset correction circuit 227 is arranged to provide corrected output voltage $V_{out}$ based on $a*V_{sqr}$, reference voltage $V_{ref}$, and peak of the squared voltage $V_{sqr\_peak}$. In one embodiment, offset correction circuit 227 may be configured to determine an offset voltage $a*Vsq_{peak}$ as described above and subtract the offset voltage from $a*V_{sqr}$ and add the resulting voltage to $V_{ramp}$ to provide $V_{out}$. In another embodiment, offset correction circuit 227 may determine an offset current based on $V_{sqr\_peak}$ and compensate a DC offset of $V_{out}$ due to C linearity correction employing the offset current.

FIG. 2 shows a particular arrangement of inputs and outputs of the various components. In one embodiment, all of the components of vertical C linearity correction circuit 210 may be included in the same chip. Alternatively, one or more of the components may be off-chip.

Figure 3:
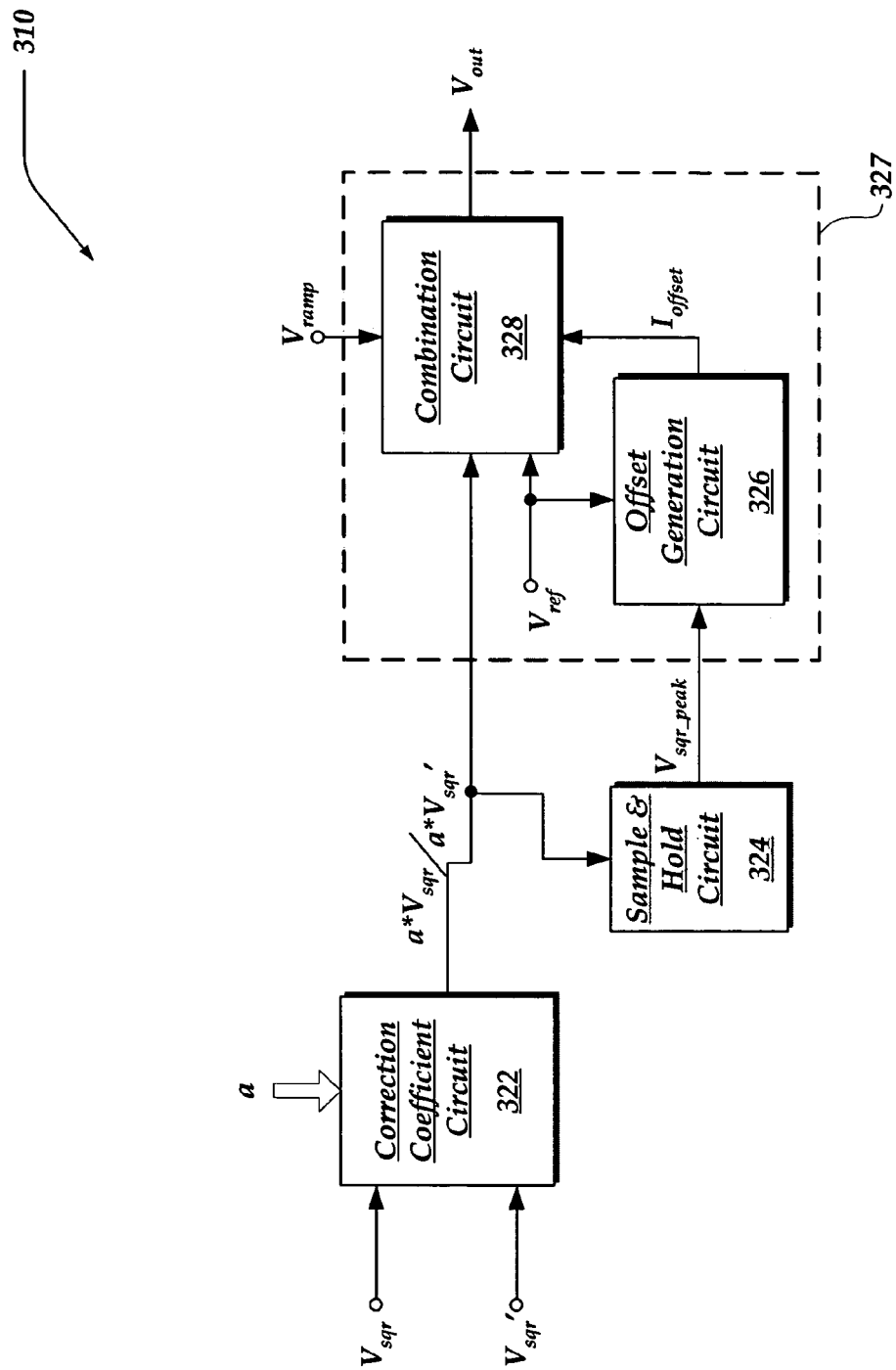
FIG. 3 is another block diagram illustrating one embodiment of a vertical C linearity correction circuit in more detail.

FIG. 3 is another block diagram illustrating vertical C linearity correction circuit 310 in more detail. Vertical C linearity correction circuit 310 includes correction coefficient circuit 322, sample-and-hold circuit 324, and offset correction circuit 327. Offset correction circuit 327 includes offset generation circuit 326 and combination circuit 328.

Correction coefficient circuit 322 is arranged to operate in a similar manner as similarly numbered correction coefficient circuit 222 of FIG. 2. Likewise, sample-and-hold circuit 324 is arranged to operate similarly as described for sample-and-hold circuit 224 above.

Offset correction circuit 327 includes offset generation circuit 326, which is arranged to provide an offset current $I_{offset}$ to combination circuit 328 based on $V_{sqr\_peck}$ and DC reference voltage $V_{ref}$.

Combination circuit 328 is arranged to provide a corrected output voltage $V_{out}$ based on $V_{ramp}$, $V_{ref}$, $I_{offset}$, and an output voltage $a*V_{sqr}$ of correction coefficient circuit 322 such that horizontal lines at the top and the bottom of the screen are substantially equally spaced and the picture is not substantially shifted upward or downward on the screen. In one embodiment, combination circuit 328 is arranged to provide $V_{out}$ according to equation (2).

Figure 4:
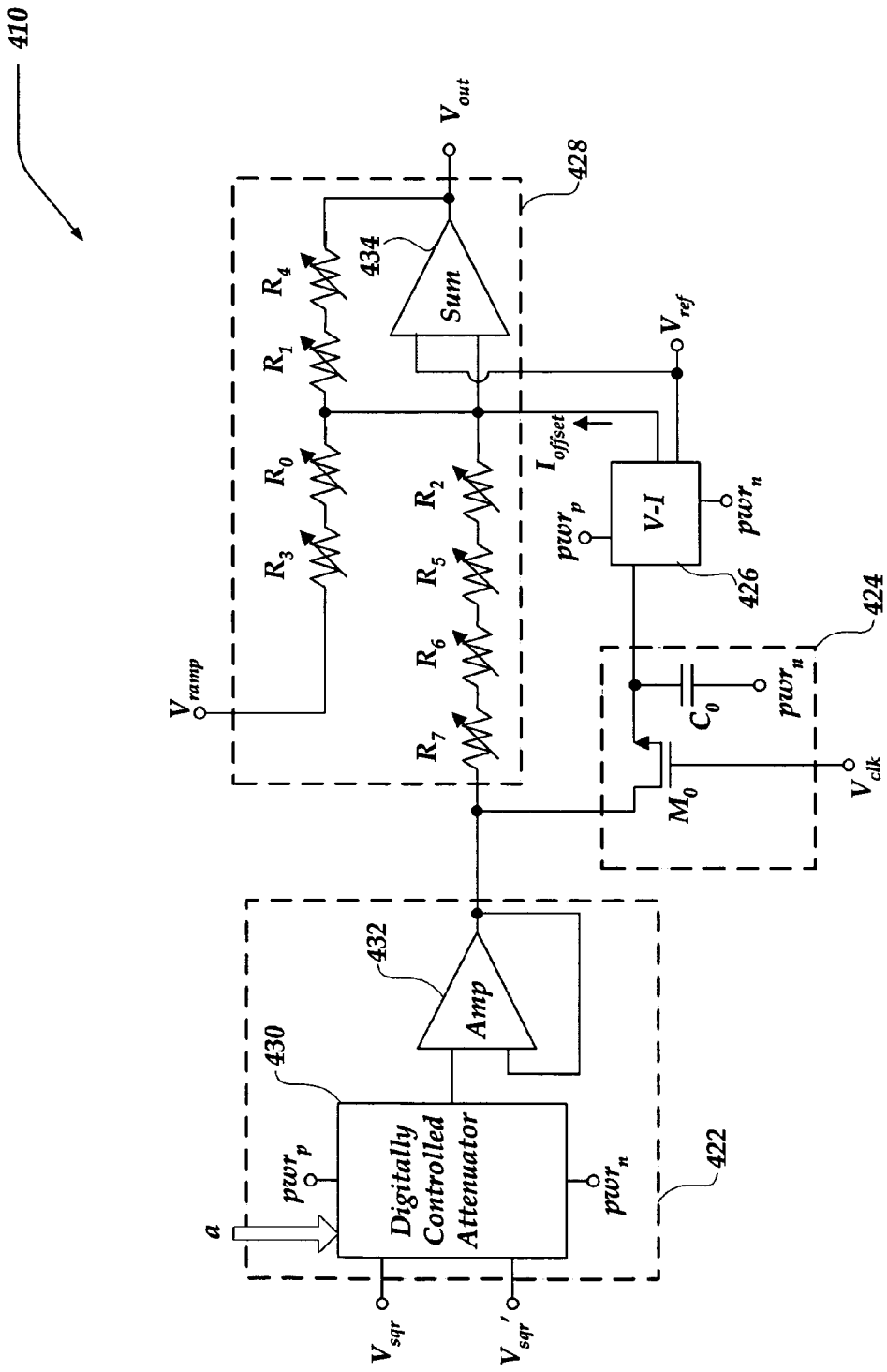
FIG. 4 schematically illustrates an embodiment of the vertical C linearity correction circuit of FIG. 3.

FIG. 4 schematically illustrates an embodiment of vertical C linearity correction circuit 410. Vertical C linearity correction circuit 410 includes correction coefficient circuit 422, sample-and-hold circuit 424, voltage-controlled current source 426, and combination circuit 428. Correction coefficient circuit 422 includes digitally controlled attenuator 430 and operational amplifier 432. Sample-and-hold circuit 424 includes sampling transistor $M_0$ and holding capacitor $C_0$. Combination circuit 428 includes resistors $R_0$–$R_7$, and operational amplifier 434.

Digitally controlled attenuator 430 is arranged to receive negative and positive squared voltages $V_{sqr}$ and $V_{sqr}'$, and to provide an output voltage $a*V_{sqr}$ or $a*V_{sqr}'$ ($a*V_{sqr}$ for a top correction and or $a*V_{sqr}'$ for a bottom correction), where "a" is the correction coefficient. In one embodiment, digitally controlled attenuator 430 may be a digitally controlled resistor bank, a series of digitally controlled transistors, and the like. Correction coefficient "a" may be attenuation factor of $V_{sqr}$ or $V_{sqr}'$ when the voltage goes through the resistor bank or transistors.

Operational amplifier 432 is in, one embodiment, arranged to operate as a buffer. Operational amplifier 432 may be arranged to receive $a*V_{sqr}$ or $a*V_{sqr}'$ from digitally controlled attenuator 430, and to provide substantially similar voltages to combination circuit 428 and to sample-and-hold circuit 424.

Sampling transistor $M_0$ and holding capacitor $C_0$ are arranged to receive $a*V_{sqr}$ or $a*V_{sqr}'$ from the output of operational amplifier 432, and to provide $a*V_{sqr\_peak}$ to voltage-controlled current source 426 based on a clock signal $V_{clk}$ that is provided to a gate of $M_0$.

Voltage-controlled current source 426 is arranged to receive $a*V_{sqr\_peak}$ and reference voltage $V_{ref}$, and to provide an offset current $I_{offset}$ to combination circuit 428. As described above, the addition of $a*V_{sqr}$ to $V_{ramp}$ may result in an offset of the output voltage $V_{out}$ causing the picture to shift upward or downward on the screen. Voltage-controlled current source 426 is configured to employ $V_{sqr\_peak}$ and $V_{ref}$ to generate offset current $I_{offset}$, which is used by combination circuit 428 to shift output voltage $V_{out}$ such that a start and an end point of the sawtooth waveform remains constant.

Combination circuit 428 is arranged to receive $a*V_{sqr}$ from operational amplifier 432; $I_{offset}$ from voltage-controlled current source 426; and $V_{ramp}$, which provides the sawtooth-shaped sweeping voltage. Combination circuit 428 is further arranged to provide corrected output voltage $V_{out}$ to drive a vertical sweep of the electron beam. Correction voltage $a*V_{sqr}$ is provided to an input of operational amplifier 434, which is configured to operate as a summation amplifier with adjustable resistors $R_7$, $R_6$, $R_5$, and $R_2$. Adjustable resistors $R_7$, $R_6$, $R_5$, and $R_2$ are arranged to provide further adjustment of squared voltage $V_{sqr}$, as well as to provide an addition or a subtraction of an offset voltage that is determined by offset current $I_{offset}$ and values of resistors $R_7$, $R_6$, $R_5$, and $R_2$.

Ramping voltage $V_{ramp}$ is also provided to the same input of summation amplifier 434 through adjustable resistors $R_3$ and $R_0$. Furthermore, an output of operational amplifier 434 is provided to the same input as a feedback voltage through resistors $R_1$ and $R_4$. Reference voltage $V_{ref}$ is provided to another input of operational amplifier 434. Output voltage $V_{out}$ of operational amplifier 434 is employed to drive a vertical sweep of a display with C linearity correction and corrected DC offset.

Figure 5:
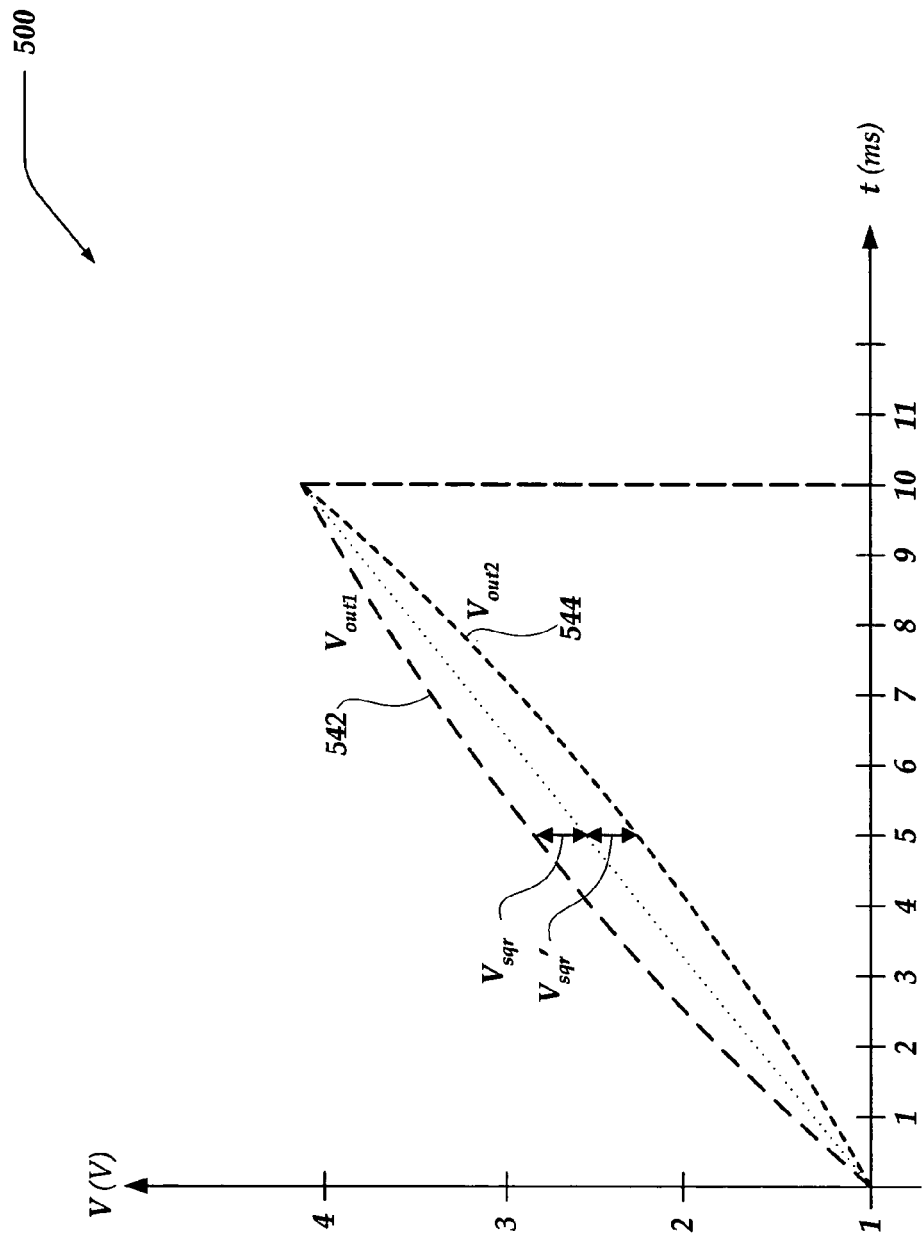
FIG. 5 illustrates waveforms of an embodiment of an output voltage of the vertical C linearity correction circuit of FIG. 4, according to aspects of the present invention.

FIG. 5 illustrates voltage diagram 400 showing waveforms of an output voltage of the vertical C linearity correction circuit of FIG. 4.

A vertical axis of voltage diagram 500 represents voltage V in volts. A horizontal axis represents time t in milliseconds (ms). While volts and milliseconds are represented on voltage diagram 500, the invention is not so limited. Virtually any voltage and time units may be employed in implementing the present invention without departing from spirit and scope of the invention. Voltage diagram 500 illustrates two waveforms including waveform 542 representing corrected output voltage $V_{out1}$ for a bottom of the screen correction and waveform 544 representing corrected output voltage $V_{out2}$ for a top of the screen correction. The waveforms represent one cycle of a sawtooth-shaped sweeping voltage. The same waveform is typically repeated when the circuit is operational.

Both voltages begin at t=0. Without C linearity correction, output voltage may rise linearly resulting in unequal spacing between horizontal lines at the top or the bottom of the screen. When positive correction voltage $V_{sqr}$ is added for correction of line spacing at the top of the screen, corrected output voltage $V_{out2}$ (544) has a concave shape bending downward. This results in an increase of horizontal line spacing at the top of the screen by pushing an electron beam further up, toward the top of the screen.

An opposite effect is observed, when negative correction voltage $V_{sqr}'$ is applied. Corrected output voltage $V_{out1}$ has a convex shape bending upward. This results in an increase of horizontal line spacing at the bottom of the screen by pushing an electron beam further down, toward the bottom of the screen.

As described previously, an application of offset current $I_{offset}$ may prevent a shifting of the output voltage up or down due to the addition of the correction voltage. Accordingly, a start and an end point of the sawtooth shape remain constant at the same points as if there was no correction. This, in turn, prevents shifting of the picture upward or downward on the screen.

In one embodiment, correction voltages $V_{sqr}$ and $V_{sqr}'$ may be derived from ramping voltage $V_{ramp}$ at a center of the voltage, as shown in the figure.

The above specification, examples and data provide a description of the manufacture and use of the composition of the invention. Since many embodiments of the invention can be made without departing from the spirit and scope of the invention, the invention also resides in the claims hereinafter appended.

What is claimed is:

1. A device for performing C linearity correction, comprising:
   a correction coefficient circuit that is arranged to provide a correction voltage in response to a squared voltage and a correction coefficient signal;
   a sample-and-hold circuit that is arranged to receive the correction voltage and a clock signal, and to provide a peak correction voltage by sampling the correction voltage in response to the clock signal;
   an offset correction circuit that is arranged to provide a corrected output voltage in response to the correction voltage, the peak correction voltage, and a ramping voltage such that a line spacing between horizontal lines toward a top and a bottom of a screen is maintained substantially constant.

2. The device of claim 1, wherein the correction coefficient circuit is further arranged to receive an inverted squared voltage such that:
   the squared voltage is employed to provide the correction voltage for C linearity at the top of the screen; and the inverted squared voltage is employed to provide the correction voltage for C linearity correction at the bottom of the screen.

3. The device of claim 1, wherein the correction coefficient circuit comprises a digitally controlled attenuator circuit that is arranged to attenuate the squared voltage based on the correction coefficient signal.

4. The device of claim 3, wherein the digitally controlled attenuator circuit comprises at least one of a digitally controlled adjustable resistor bank and a plurality of digitally controlled transistors.

5. The device of claim 1, wherein the correction coefficient circuit further comprises an operational amplifier that is arranged to operate as a follower and to provide the correction voltage to the sample-and-hold circuit and the offset correction circuit.

6. The device of claim 1, wherein the sample-and-hold circuit comprises a sampling transistor and a holding capacitor that are arranged to provide a peak correction voltage to the offset correction circuit.

7. The device of claim 6, wherein the clock signal is provided to a gate of the sampling transistor such that the sampling transistor is activated and deactivated based on the clock signal.

8. The device of claim 1, wherein the offset correction circuit comprises an offset generation circuit and a combination circuit.

9. The device of claim 8, wherein the offset generation circuit comprises a voltage-controlled current source.

10. The device of claim 9, wherein the voltage-controlled current source is arranged to provide an offset current to the combination circuit based, in part, on a comparison of a reference voltage and the peak correction voltage.

11. The device of claim 10, wherein the adjustable resistors are arranged to receive the offset current and provide an offset voltage that is employed to shift the corrected output voltage.

12. The device of claim 11, wherein the shift provided by the offset voltage maintains a vertical position of a picture on the screen after the C linearity correction.

13. The device of claim 8, wherein the combination circuit includes an operational amplifier that is arranged to operate as a summing amplifier.

14. The device of claim 13, wherein the summing amplifier is arranged to receive the correction voltage, the reference voltage, and the offset voltage.

15. A device for performing C linearity correction, comprising:
a sample-and-hold circuit that is arranged to sample a correction signal and to provide a peak signal based on the correction signal;
an offset circuit that is arranged to receive the peak signal and to provide an offset signal in response to the peak signal; and
a combination circuit that is arranged to receive a sweep signal, the correction signal, and the offset signal, and to provide a corrected output signal such that a line spacing between horizontal lines toward a top and a bottom of the screen is maintained substantially constant, and a DC offset that is caused by the C linearity correction is substantially reduced, wherein the corrected output voltage controls a sweep of an electron beam on a screen.

16. The device of claim 15, wherein:
the correction signal includes a second order function waveform that is modified by a correction factor;
the offset signal includes at least one of an offset current and an offset voltage; and
the sweep signal has a substantially sawtooth-like shape.

* * * * *

UNITED STATES PATENT AND TRADEMARK OFFICE
CERTIFICATE OF CORRECTION

PATENT NO.       : 6,995,526 B1
APPLICATION NO.  : 10/914561
DATED            : February 7, 2006
INVENTOR(S)      : Charles Guan It is certified that error appears in the above-identified patent and that said Letters Patent is hereby corrected as shown below:

In the Specification:

**Column 4, Line 31, Delete "a*Vsq$_{\_peak}$" and insert - - a*V$_{sqr\_peak}$ - -.**

Column 4, Line 56, Delete "V$_{sqr\_peck}$" and insert - - V$_{sqr\_peak}$ - -.

Signed and Sealed this

Fifteenth Day of August, 2006

JON W. DUDAS
*Director of the United States Patent and Trademark Office*